July 15, 1969    L. STELLA    3,455,615
SEAL
Filed Aug. 23, 1966
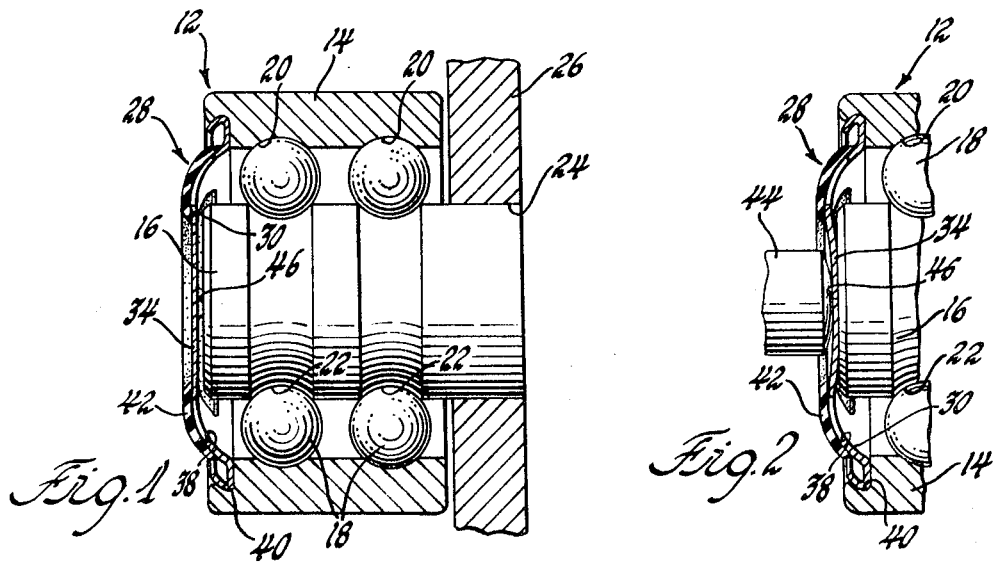
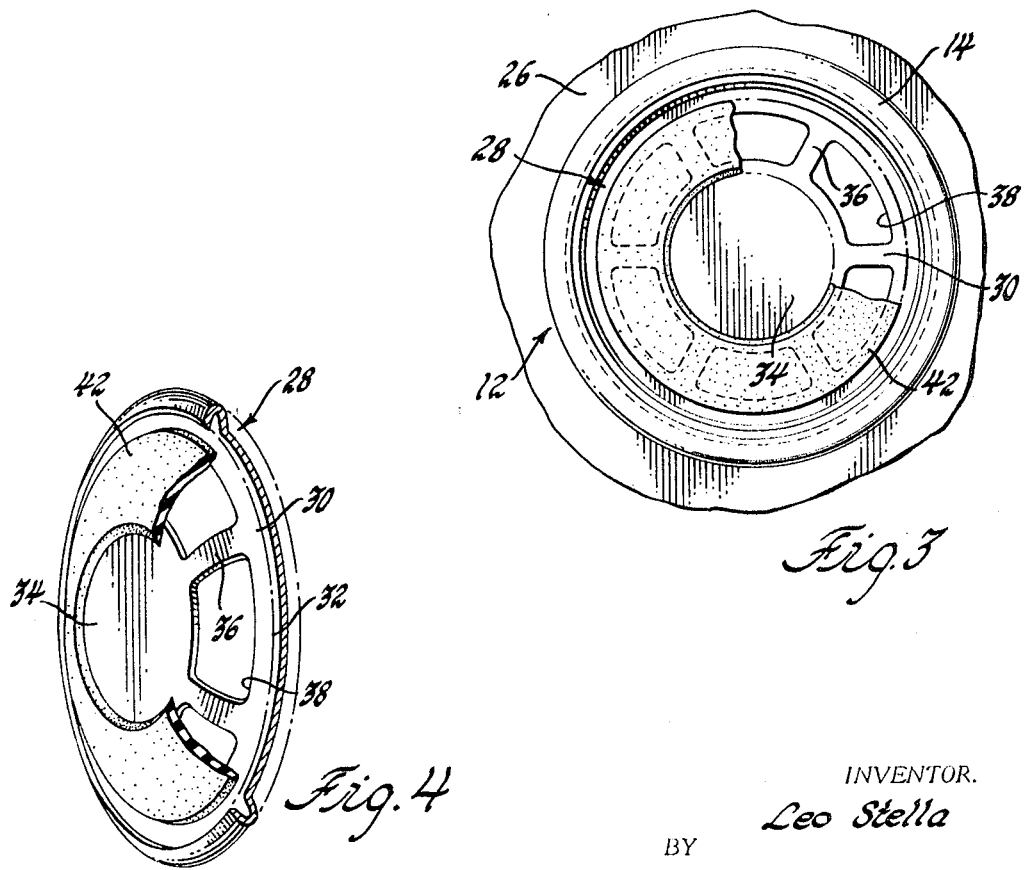
INVENTOR.
Leo Stella
BY
F. J. Fodale
ATTORNEY

United States Patent Office 3,455,615
Patented July 15, 1969

3,455,615
SEAL
Leo Stella, Bristol, Conn., assignor to General Motors Corporation, Detroit, Mich., a corporation of Delaware
Filed Aug. 23, 1966, Ser. No. 574,376
Int. Cl. F16c 1/24, 33/78
U.S. Cl. 308—187.1
3 Claims

ABSTRACT OF THE DISCLOSURE

A unit-handled antifriction bearing has a dished closure at one end which comprises a sheet metal body with an annular rim connected to a circular center by radial webs. An annulus of rubber-like material is bonded to the body in the area of the webs to form a positive closure. The closure thus formed is spaced from the inner race and is sufficiently resilient to be deflected into abutment with the inner race so that the inner race may be press fitted onto a support.

---

My invention relates generally to a closure and more particularly to a positive closure which is normally axially spaced from the inner relatively rotatable member or race of a bearing assembly but which is resiliently deflectable into engagement with the race to aid in mounting the bearing in its application.

In some bearing applications, particularly those types of applications utilized in a particularly deleterious type of environment, it becomes necessary to provide a positive closure for the exposed end of the bearing. A positive closure is one which closes the entire circular space bounded by the outer race. For effective operation, the closure must be axially spaced from the inner race to prevent contact therewith and consequently excessive wear on the closure. However, often these types of bearings are supplied in a unit-handled assembly and must be press fitted onto their mounts. Since it is harmful to the assembly to transmit force through the outer race and balls or rollers to the inner race, either the closure must be removed, if possible, or the force transmitted through it. My invention is primarily directed toward a positive type closure for such a bearing which need not be removed in order to mount the bearing.

Another object of my invention is to provide such a closure for a bearing which is flexible so that force may be transmitted through the closure to the inner race to facilitate its being press fitted to a mount or support.

Other objects and advantages of the invention will hereinafter become more fully apparent from the following description of the annexed drawings, which illustrate a preferred embodiment, and wherein:

FIGURE 1 is an elevation partially in cross section of a double row ball bearing provided with a positive type closure in accordance with my invention.

FIGURE 2 shows a portion of FIGURE 1 with the closure plate being flexed into abutment with the inner relatively rotatable member so that force may be applied to the member to press fit it into a bore.

FIGURE 3 is a front view of the bearing shown in FIGURE 1.

FIGURE 4 is a perspective view of the closure shown in FIGURE 1.

Referring now to the drawings and more particularly to FIGURE 1, a bearing is indicated generally at 12. The bearing 12 comprises a race 14 which is relatively rotatable with respect to an inner stub shaft 16 and radially antifrictionally spaced from it by two rows of circumferentially spaced balls 18. The balls ride in raceways 20 and 22 on the outer race 14 and stud shaft 16, respectively. While the particular embodiment shown in FIGURE 1 has raceways formed on the stub shaft 16 directly, it is to be understood that my invention is equally applicable to those situations wherein the inner race is a separable piece mounted on a shaft. The right-hand end of the stub shaft as viewed in FIGURE 1 is press fitted into the bore 24 of a mounting plate 26. The closure for the left-hand end of the bearing is indicated generally at 28.

Referring to FIGURE 4, the closure 28 is seen to comprise a sheet metal disc 30 which has an outer annulus 32 connected to a central circular portion 34 by a number of radial wabs 36. Windows 38 are formed between the webs 36. The connection of circular portion 34 to the outer annulus 32 by relatively thin webs increases the flexibility of the closure and allows greater axial displacement of the midsection 34 with respect to the outer annulus 32.

The closure plate 28 also includes an annulus of resilient rubber-like material 42 bonded to the disc 30 across the area of the windows 38. The annulus 42 extends onto the central portion 34 a slight amount in order to seal off the windows 38, however, a substantial amount of the central portion 34 is uncovered leaving a metal surface which is capable of receiving force from a tool and transmitting it to the inner race without harm. The radial outer portion of the resilient annulus 42 likewise extends into the outer annulus 32 of the disc 30 a slight amount to completely seal the windows 38. The outer rim of the disc 30 is dispersed in a mounting groove 40 in the outer race 14 adjacent its left end wall. See FIGURE 1. While the particular method of mounting the closure plate 28 to the outer race 14 is immaterial to my invention, a convenient way of mounting the closure plate 28 is disclosed in the U.S. Patent to Cobb 2,850,792 assigned to the assignee of my invention.

The particular advantage of my invention is best understood from FIGURES 1 and 2. When the stub shaft 16 is to be press fitted into the bore 24 of the mounting plate 26, a tool 44 engages the outer metal surface of portion 34 and deflects the closure 28 into abutment with the left end wall 46 of the shaft 16. Force is then transmitted from the tool through the closure 28 to the shaft 16 to press fit it into the bore 24.

Thus it can be seen that I have provided a closure for a bearing which makes it possible to mount the bearing without having to remove the closure and without harm to the bearing or to the closure.

It should be understood, of course, that the foregoing disclosure relates to only a preferred embodiment of my invention and that it is intended to cover all changes and modifications of the example of the invention herein chosen for the purposes of the disclosure, which do not constitute departures from the spirit and scope of my invention.

I claim:
1. The combination comprising:
   an outer race having first and second end walls,
   an inner race having a first end wall substantially axialyl aligned with said first end wall of said outer race,
   antifriction means disposed between said outer race and said inner race; said outer race, inner race and antifriction means being in a unit-handled relationship with said inner race extending substantially beyond said second end wall of said outer race whereby said inner race is adapted to be mounted in the bore of a supporting wall, and
   a circular closure mounted on said outer race adjacent the first end wall thereof, said closure comprising,
   a sheet metal disc having an outer annular portion connected to a central circular portion by a plurality of radial webs, and an annulus of resilient rubber-like material bonded to said sheet metal disc in the area of said webs to form a positive closure, and said closure being dished-shaped so that the portion of said closure adjacent said inner race is axially spaced from the said first end wall of said inner race, said closure being flexible whereby it may be deflected into abutment with said first end wall of said inner race to transmit a force therethrough whereby said inner race may be mounted in the bore of a supporting wall by a force applied to said first end wall of said inner race through said closure.

2. The combination comprising:

an outer race having first and second end walls, an inner race having first and second end walls, antifriction means disposed between said outer race and said inner race; said outer race, inner race and antifriction means being in a unit-handled relationship, and a closure comprising, a sheet metal substantially circular body axially spaced from the first end wall of said inner race, a plurality of webs extending radially from said body, an outer annulus connecting the outer ends of said webs, the outer rim of said annulus being mounted on said outer race adjacent said first end wall, and an annulus of resilient rubber-like material bonded to said body, webs, and outer annulus forming a positive flexible closure deflectable into abutment with said first end wall of said inner race, said resilient rubber-like annulus being bonded to said circular body at its outer margin only leaving a substantial portion of said circular body exposed whereby said closure may be deflected into abutment with said first end wall of said inner race without contact of said resilient rubber-like annulus.

3. The combination as defined in claim 2 wherein the first end wall of said inner race is substantially axially aligned with said first end wall of said outer race and wherein said closure is dished.

References Cited

UNITED STATES PATENTS

| 2,510,659 | 6/1950 | Ristow | 308—187.1 X |
| 3,012,830 | 12/1961 | Geibel | 308—187.1 X |
| 3,177,041 | 4/1965 | Isenbarger | 308—187.1 X |
| 2,916,313 | 12/1959 | Ziller et al. | 308—187.1 X |

FOREIGN PATENTS

| 703,457 | 2/1965 | Canada. |
| 1,021,211 | 12/1957 | Germany. |
| 1,059,775 | 3/1954 | France. |
| 1,080,356 | 4/1960 | Germany. |

OTHER REFERENCES

Barden Ball Bearings, Engineering Data, June 1961, Data Sheet F-1.

MARTIN P. SCHWADRON, Primary Examiner

FRANK SUSKO, Assistant Examiner